United States Patent
Jamison et al.

(10) Patent No.: US 7,301,660 B2
(45) Date of Patent: Nov. 27, 2007

(54) SYSTEMS AND METHODS FOR REMOTE TESTING OF PRINTING DEVICES

(75) Inventors: Terry Ryan Jamison, Boise, ID (US); John Moffatt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1074 days.

(21) Appl. No.: 10/370,016

(22) Filed: Feb. 20, 2003

(65) Prior Publication Data

US 2004/0165210 A1    Aug. 26, 2004

(51) Int. Cl.
*G06F 3/12* (2006.01)
*G06K 15/00* (2006.01)

(52) U.S. Cl. .............. 358/1.15; 358/1.1; 358/1.14

(58) Field of Classification Search .............. 358/1.15, 358/1.1, 1.14, 500, 504, 400, 401, 403, 406, 358/501
See application file for complete search history.

(56) References Cited

U.S. PATENT DOCUMENTS

| | | | | |
|---|---|---|---|---|
| 5,828,864 A | * | 10/1998 | Danknick et al. | ............. 703/24 |
| 6,385,560 B1 | * | 5/2002 | Montgomery et al. | ...... 702/183 |
| 7,076,086 B2 | * | 7/2006 | Miyake et al. | ............. 382/112 |

* cited by examiner

*Primary Examiner*—Douglas Q. Tran

(57) ABSTRACT

Systems and methods are described herein for remote testing of printing devices. A printing device includes a browser that is configured to establish a remote connection with a network site maintained by a manufacturer of the printing device. Once a connection is established, the printing device requests that a test be performed. A test program at the manufacturer site downloads a print test in the native language of the printing device. If the print test fails, more complete diagnostics are run. A printing device user is informed of the result. A user can determine if the printing device is operational without first installing a software driver or making connections to a host. Operational problems are, therefore, more easily isolated and resolved.

17 Claims, 4 Drawing Sheets

SYSTEMS AND METHODS FOR REMOTE TESTING OF PRINTING DEVICES

TECHNICAL FIELD

This invention generally relates to testing printing devices. More particularly, the invention relates to improved systems and methods for remote diagnostics and testing of printing devices.

BACKGROUND

When a printing device is installed on a host computer or a computer network, a test is typically performed on the printing device to determine if the printing device operates properly. One problem with this type of testing, however, is that there are components other than the printing device itself that could cause a print operation to fail. For example, a printer driver installed on a host computer could have an error in it and cause a print failure even if the printing device is operationally sound. Or, a problem may lie in a host computer operating system. Furthermore, there could be a connection problem between the host computer and the printing device—i.e., a faulty cable, a loose cable connection, etc.—that is causing the failure.

This type of problem is being seen more frequently as printing devices are more commonly connected to computer networks and are shared among several computers. Setting up a printing device in such an environment is significantly more complicated than simply hooking up a printer to a computer. There may be several different ways in which a network printing device may be configured on a network, depending on the type of network, the size of the network, the capacity of the network, etc.

As the number of setup parameters increases, so does the chance that an error will be made in the setup procedure. After setting up a printing device that fails to print, a major hurdle is determining whether the problem lies in the printing device (hardware) or in the configuration (software). Even a local self test on a printing device may not answer this question in the event that there is a hardware problem in the communication channel(s) between the printing device and the network, which a printing device self test will not typically detect.

SUMMARY

Systems and methods are described herein for remote testing of printing devices. By handling a test remotely, all components of a printing device—including the communication channels—can be adequately tested to determine if the printing device is operationally functional.

A printing device includes a browser that allows the printing device to access a web site maintained by a manufacturer of the printing device. The printing device identifies its type, or model, to the web site, which then runs a print test on the remote printing device. If the print test is successful—i.e., the printing device can print a page from the test data—then any problem experienced by the printing device in a particular environment can be determined to be with the environment and not with the printing device.

The web site may determine whether a test is successful or not either automatically or by requiring an acknowledgement by a user whether the printing device has printed a page correctly or not.

If the web site determines that the print test has failed, then in one implementation, the web site proceeds to run remote diagnostics on the printing device. Problems discovered from the diagnostics are immediately made available to technicians at the printing device manufacturer. Solutions for the problems may then be immediately crafted and executed.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The following description sets forth one or more specific implementations and/or embodiments of systems and methods for remote testing of printing devices. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods for remote testing of printing devices. Applicant intends these exemplary implementations to be examples only. Applicant does not intend these exemplary implementations to limit the scope of the claimed present invention. Rather, Applicant has contemplated that the claimed present invention might also be embodied and implemented in other ways, in conjunction with other present or future technologies.

Computer-Executable Instructions

An implementation of a system and/or method for remote testing of printing devices is presented and may be described in the general context of computer-executable instructions or processor-executable instructions, such as program modules, executed by one or more printing devices, computers or other devices. Generally, program modules include routines, programs, objects, components, data structures, etc., that perform particular tasks or implement particular abstract data types. Typically, the functionality of the program modules may be combined or distributed as desired in various embodiments.

Computer-Readable Media

An implementation of a system and/or method for remote testing of printing devices may be stored on or transmitted across some form of computer-readable media. Computer-readable media can be any available media that can be accessed by a computer and/or processor. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer and/or processor.

"Communications media" typically embodies computer-readable instructions, data structures, program modules, or other data in a modulated data signal, such as carrier wave or other transport mechanism. Communication media also includes any information delivery media.

Exemplary Environment

Figure 1:
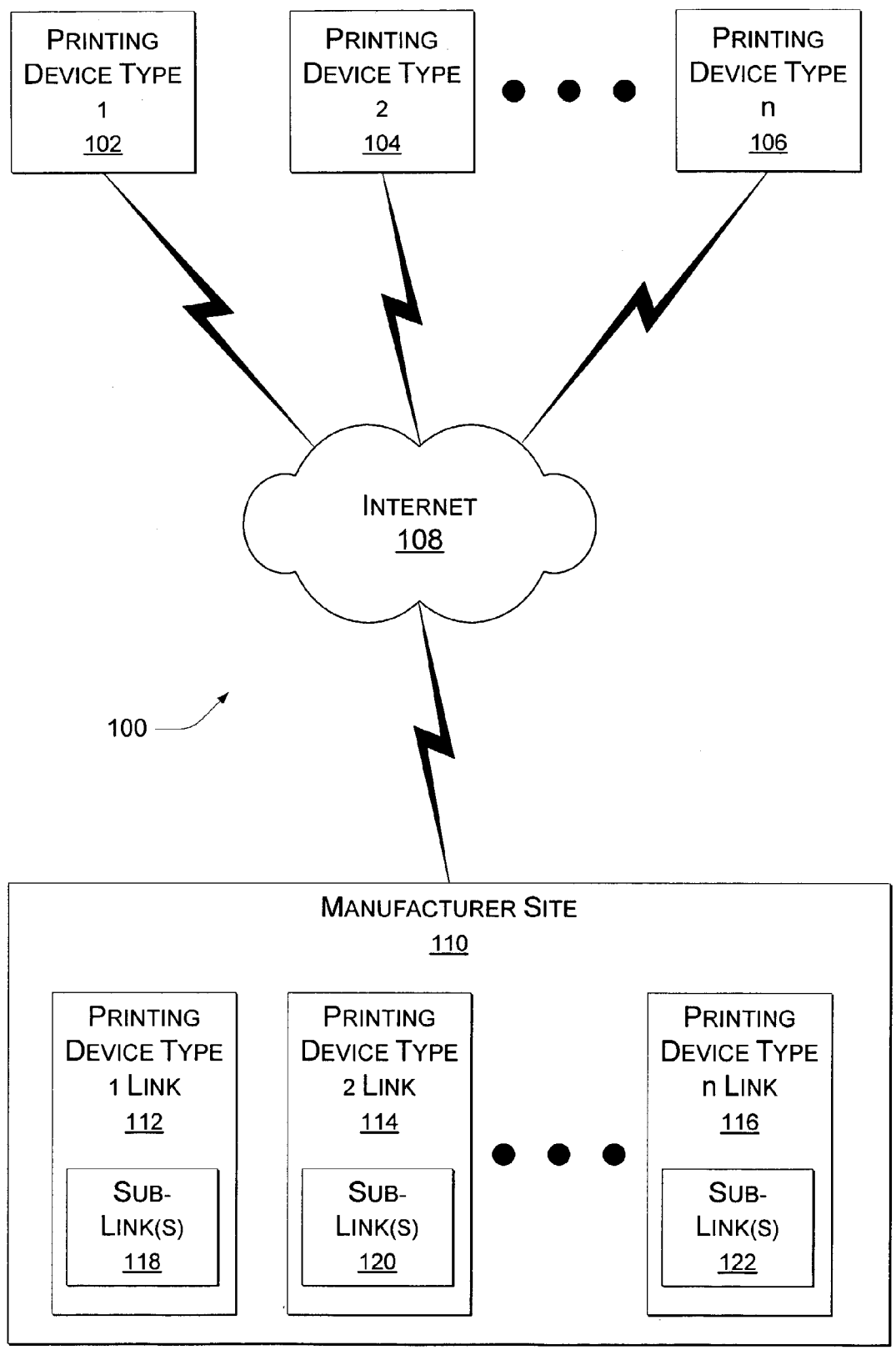
FIG. 1 is a block diagram of a suitable environment for remote testing of printing devices.

FIG. 1 is a depiction of an exemplary environment 100 in which the systems and methods described herein may be implemented. The environment 100 includes multiple printing devices 102-106 that may be of several different types and/or models. The printing devices 102-106 may be one or more of the following types of printing devices: laser printers, inkjet printers, dot matrix printers, photocopiers, fax machines, plotters, or the like.

Although only three printing devices 102-106 are shown, it is noted that the present description contemplates from one to several hundred or thousand printing devices. The printing devices 102-106 are typically situated at different locations, such as in different offices, buildings, cities, countries, etc. The particular distribution of the printing devices 102-106 and their locations are not essential as long as the printing devices 102-106 are configured to access a computer network.

As shown in FIG. 1, the printing devices 102-106 communicate with the Internet 108. However, it is noted that the present description applies to any other type of computer network, such as a local area network (LAN), a wide area network (WAN), and the like.

A manufacturer site 110 is located on the Internet 108 and is maintained by a manufacturer of the printing devices 102-106. The manufacturer site 110 includes several links 112-116 to information and services for the printing devices 102-106. Each link 112-116 may contain one or more sub-links 118-122. The manufacturer site 110 and its links 102-106 and sub-links 118-122 will be discussed in greater detail, below, with respect to FIG. 3.

The printing devices 102-106 are configured to contact the manufacturer site 110 via the Internet 108. Once on the site 110, each printing device 102-106 can navigate the links 112-116 and sub-links 118-122 to obtain information, services, products, and the like. As will be described in greater detail below, the printing devices 102-106 are configured to access the manufacturer site 110 and request one or more tests for the particular type (i.e., model) of the printing device 102-106. The manufacturer site 110 is configured to control the printing devices 102-106 and execute a print test on the printing devices 102-106.

Exemplary Printing Device

Figure 2:
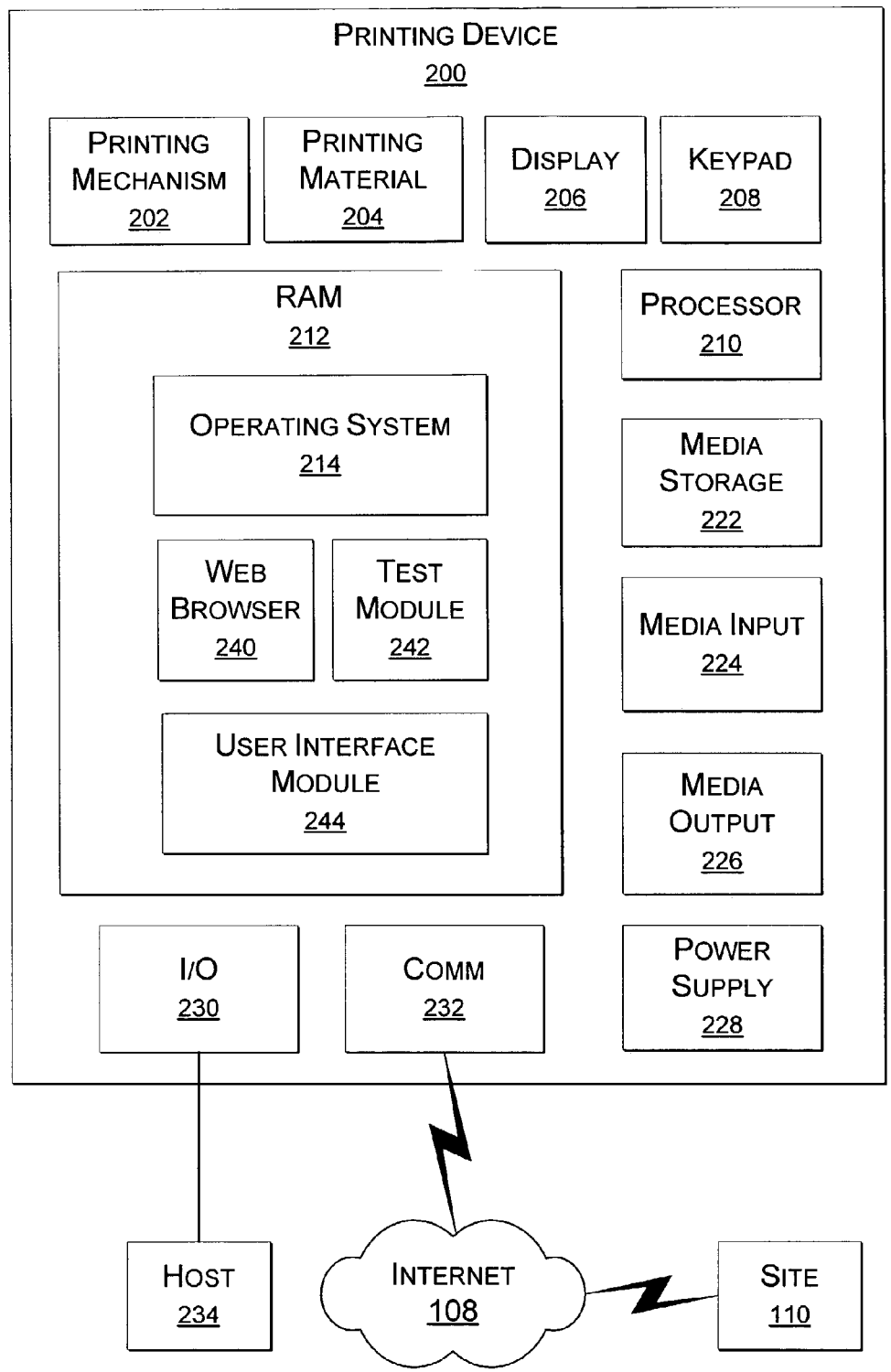
FIG. 2 is a block diagram of an exemplary printing device.

FIG. 2 is a block diagram of an exemplary printing device 200 constructed in accordance with the present systems and methods. The printing device 200 may be a laser printer, inkjet printer, dot matrix printer, photocopier, facsimile machine, plotter or the like. For purposes of the present discussion, the printing device 200 will be described generically. A printing device constructed in accordance with the printing device 200 shown in FIG. 2 may include functional equivalents of the components shown and described in FIG. 2, or may include more or less components than those shown in FIG. 2. In the discussion of FIG. 2, continuing reference will be made to the elements and reference numerals shown in FIG. 1.

The printing device 200 includes a printing mechanism 202 and printing material 204 that will differ depending on the embodiment of the printing device 200. For example, if the printing device 200 is a laser printer, then the printing mechanism 202 will be a drum/fuser and the printing material 204 will be toner. If the printing device 200 is an inkjet printer, then the printing mechanism 202 will be a print head and the printing material 204 will be ink.

The printing device 200 also includes a display 206 and a keypad 208. The keypad 208 may also be integrated with the display 206, such as in a key diagram on a touch-sensitive display. The display 206 and keypad 208 are a user interface that allows the printing device 200 to provide messages to a user via the display 206, and allows the user to enter instructions/data to the printing device via the keypad 208.

A processor 210 and random access memory (RAM) 212 are included in the printing device 200 to enable the printing device 200 to execute computer-executable instructions stored in the RAM 212 on the processor 210. An operating system 214 stored in the RAM 212 includes computer-executable instructions that control operation of the printing device 200.

The printing device 200 also includes media storage 222 (such as one or more paper trays), media input 224, media output 226 and a power supply 228 that provides electrical power to the printing device 200. The printing device 200 is configured with one or more input/output (I/O) ports 230 that may include one or more of the following: a universal serial bus (USB) port, a parallel port, and/or a serial port. The I/O port(s) 230 is (are) used to communicate with one or more local or remote host computers 234. A communications module 232—such as a network interface card, a modem, etc.—is included in the printing device 200 so that the printing device 200 may communicate with a network—such as the Internet 108—and access one or more sites 110 on the network.

A web browser 240 is stored in the memory 212 of the printing device 200 and is configured to enable the printing device 200 to communicate with the Internet 108 (or some other computer network) via the communications port 232. Although shown stored in the memory 212, the web browser 240 may also be incorporated into a separate component (not shown) in the printing device 200.

A test module 242 and a user interface module 244 are also stored in the memory 212 of the printing device 200. The test module 242 includes a set of computer-executable instructions that, when activated, perform a print test on the printing device 200. The print test may be a simple test such as attempting to print out a test pattern with the printing device 200, or the print test may be a more complex set of diagnostic tests that can be executed to attempt to identify an operational problem with the printing device 200. The test module 242 will be discussed in greater detail below.

The user interface module 244 is a set of computer-executable instructions that interact with printing device 200 hardware (e.g., the display 206 and/or the keypad 208) to receive input from and provide output to a user of the printing device 200. A user may enter commands via the keypad 208 and/or the display 206 (in the case of a touch-sensitive display); and the user receives information from the printing device 200 via the display 206. Such information may include, but is not limited to, error message, operation instructions, execution acknowledgements, status data, and the like.

The printing device 200, its components and operation will be described in greater detail below, with respect to FIG. 4.

Exemplary Remote Testing Web Site

Figure 3:
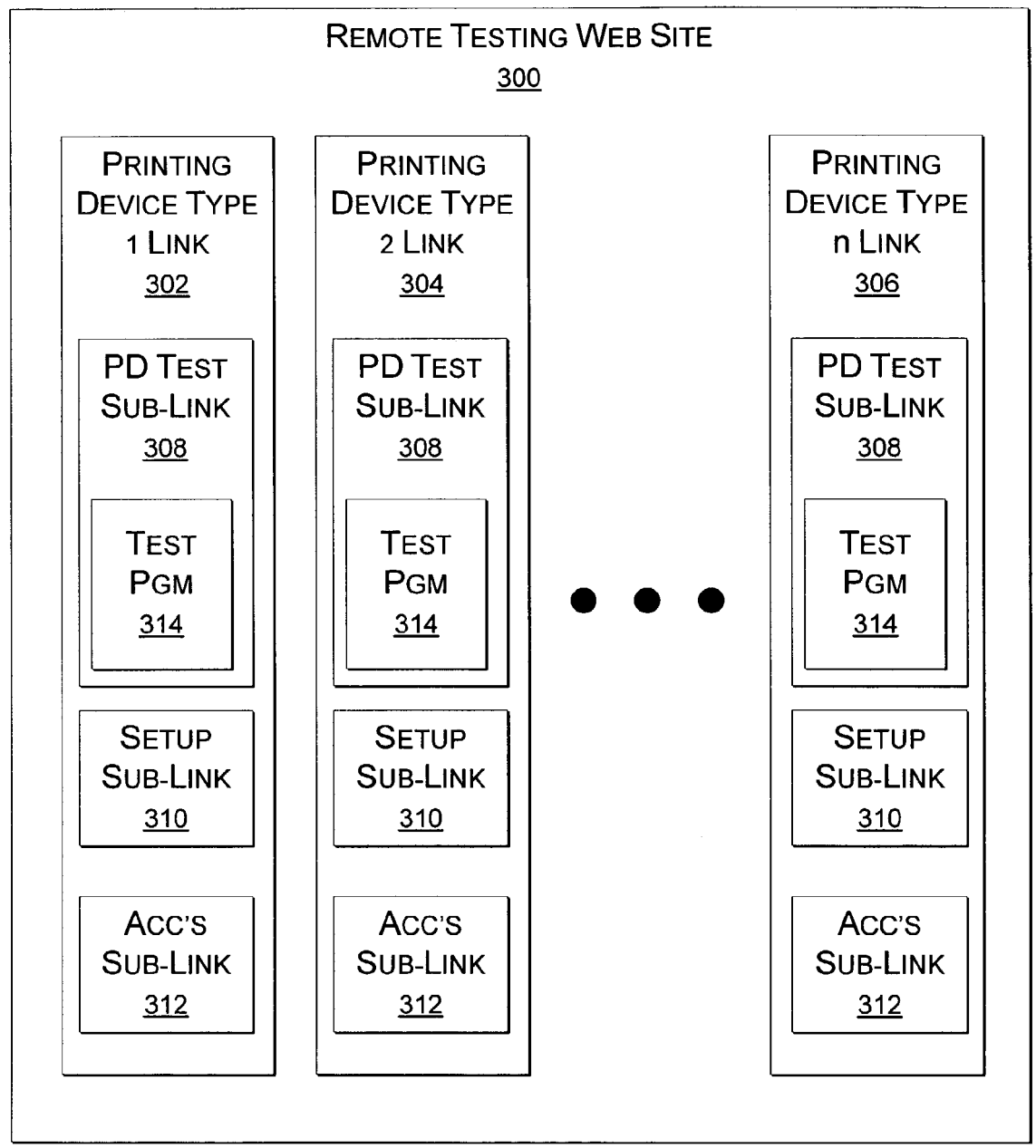
FIG. 3 is a block diagram of an exemplary remote testing web site.

FIG. 3 is a block diagram showing an exemplary remote testing web site 300 that is similar to, but is a more detailed representation of, the manufacturer site 110 shown in FIGS. 1 and 2. The exemplary remote testing web site 300 is shown and described for exemplary purposes only and is not intended to limit the scope of the appended claims.

The remote testing web site 300 includes multiple links—printing device type 1 link 302, printing device type 2 link 304, . . . , printing device type n link 306. Although three links are shown in FIG. 3, it is noted that the remote testing web site 300 may include anywhere from one to virtually any number of links.

Each link 302-306 is associated with a corresponding printing device 102-106. Although not required, there may be a link for each model of printing device marketed by the manufacturer. In another implementation, the links 302-306 may be a high-level description, such as laser printer, ink-jet printer, fax machine, copier, all-in-one device, etc. Then different model types of each such printing device may have sub-links within its corresponding link.

In the present example, each link 302-306 includes similar sub-links, namely, a printing device test sub-link 308, a setup sub-link 310 and an accessories sub-link 312. It is noted that the sub-links may be arranged or grouped differently than shown, and that there may be more than one level of sub-links depending on the particular implementation. Any number of variations may be taken based on the example presented herein.

The printing device test sub-link 308, when activated, initiates a test program 314 that is sent to the printing device 106 (assuming printing device 106 is the printing device 106 that initiated the communication). The test program 314 is in the native language of the type of printing device associated with the link 302 under which the sub-link 308 appears. The test program 314 may be a simple program that simply attempts to print a test page on the printing device 106.

If the test page prints successfully, then an acknowledgement is sent to the remote testing web site 300 to indicate that the test was successful. The acknowledgement may be automatic or may be a user response to a prompt after the test, so that the user can acknowledge the quality of the print test.

The setup sub-link 310, when actuated, provides a printing device user with a wide range of information regarding setup of the printing device 106 associated with the link 306 superior to the sub-link 310. For example, diagrams might depict how the printing device 108 is to be hooked up with a host computer 234, text documents could be available that describe technical specifications for cables, memory modules, cartridges, etc., that can be used with the printing device 106.

The accessories sub-link 312, when actuated, provides information about accessories available for the corresponding printing device 106. For example, products such as additional paper trays, memory modules, toner/ink cartridges, etc. could be advertised through the accessories sub-link 312.

In order for the setup sub-link 310 and the accessories sub-link 312 to be accessible even when the printer is not connected to a host, the information provided via those particular sub-links may require printing the information on the printing device, unless the printing device display is large enough to legibly display the information. In such an implementation, a user would navigate to the items of interest using the keypad on the printing device and actuate a button or icon to request the selected information to be printed.

Methodological Implementation: Remote Printer Testing

Figure 4:
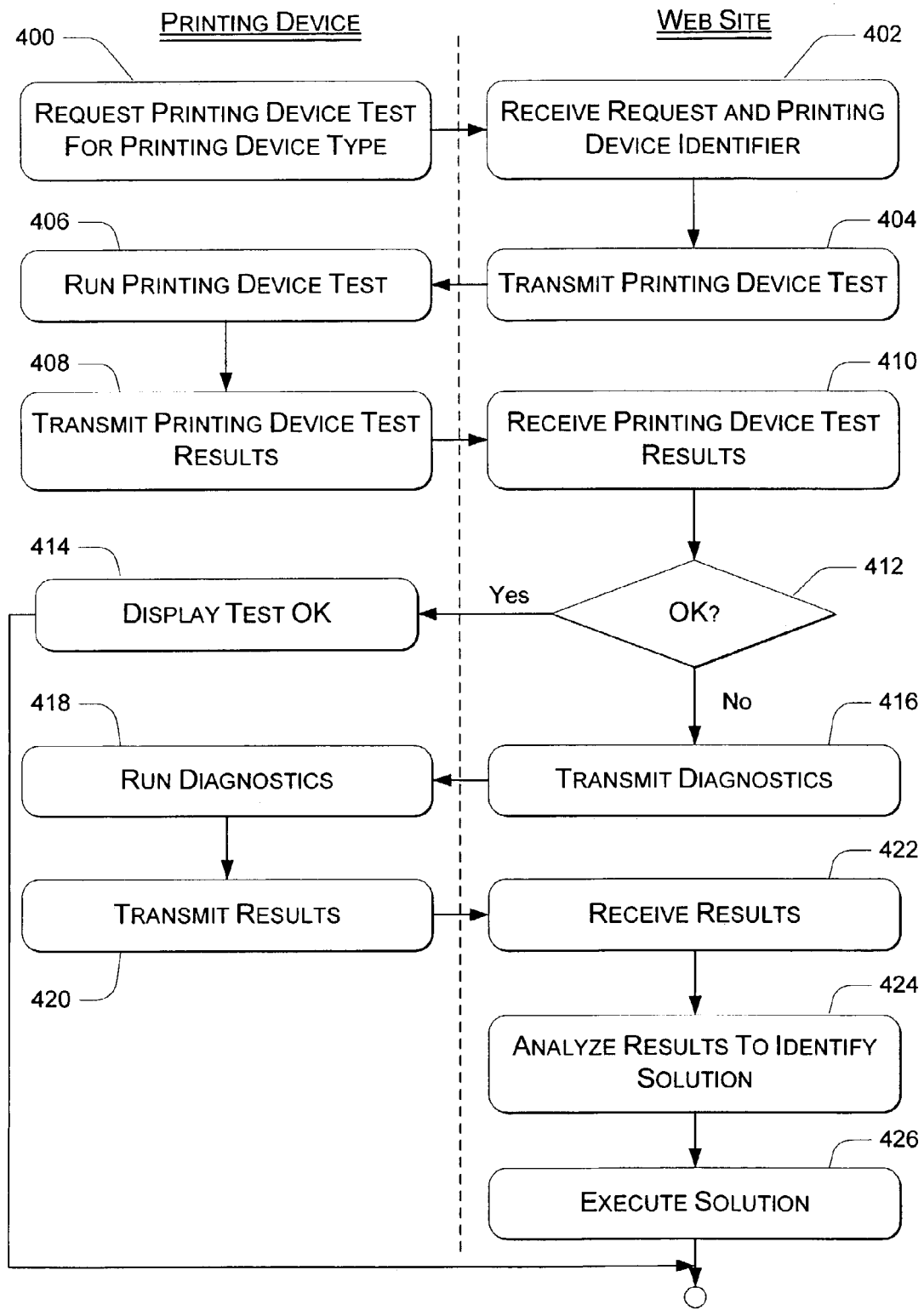
FIG. 4 is a flow diagram depicting a methodological implementation of a remote printing device testing system.

FIG. 4 is a flow diagram depicting a methodological implementation of a remote printing device testing system. In the following discussion, continuing reference will be made to the elements and reference numerals shown in FIGS. 1-3. The steps outlined in FIG. 4 are divided into steps that take place on the printing device and steps that take place on the manufacturing web site 100.

At block 400, the printing device 200 requests the test program 314 at the remote testing web site 300 to be executed on the printing device 200 by actuating the printing device test sub-link 308. The request from the printing device 200 includes data that identifies, with particularity, the type—or model—of the printing device. This identification may be accomplished with a manufacturer printer code that is recognizable at the remote testing web site 300 to identify a particular printing device.

At block 402, the remote testing web site 300 receives the print test request and printing device identifier from the printing device 200. The test program 314 transfers computer-executable instructions to the printing device 200 test module 242 (block 404) to execute on the processor 210 of the printing device 200 at block 406.

As previously discussed, in one implementation, the test program 314 is a program that provides instructions to the printing device 200 in the native language of the printing device 200, the instructions commanding the printing device 200 to print out a test page. The test module 242 may be configured to automatically determine if the test page has printed correctly and return the result to the remote testing web site 300 at block 408. However, since a page could conceivable be fed through the media input 224 and the media output 226 and still experience problems with the printing that might not be automatically detectable, the test module 242 may also be configured to prompt a user of the printing device 200 to acknowledge whether or not the test page printed correctly. The prompt would appear on the display 206 and the user could enter "Yes" or "No" through the keypad 208. The result would then be transmitted to the remote printing web site 300 at block 408.

At block 410, the remote testing web site 300 receives the print test results from the printing device 200. If the results indicate that the printing device 200 is in operational order ("Yes" branch, block 412), then the printing device 200 is directed to display a positive results message at block 414.

If the results indicate that the printing device 200 is not working ("No" branch, block 412), then the process—in one implementation—terminates after informing a manufacturer technician and/or a printing device user, etc., that the printing device is inoperable.

In another implementation shown in FIG. 4, upon determining that the printing device 200 failed to print a test page, the test program 314 conducts a more detailed diagnostics test on the printing device 200 by transmitting a diagnostics test to the printing device 200 at block 416. At block 418, the test module 242 of the printing device 200 runs the diagnostics. It is noted that the test module 242 may contain computer-executable instructions that make up the diagnostics, or may receive such instructions from the remote testing web site 300.

When the diagnostics have been run on the printing device 200 and results therefrom are obtained, the results are transmitted to the remote testing web site 300 (block 420). The test program 314 receives the results at block 422. The results may be made available to manufacturer technicians (via e-mail for example) for analysis or they may be automatically analyzed by the test program 314 to determine the nature of the printing device 200 failure (block 424) and to develop a solution to remediate the problem. The solution is executed at block 426. The solution can be a wide range of actions, such as determining that a component requires replacement or that a particular action should be taken at the printing device.

CONCLUSION

Implementation of the systems and methods described herein provide a way for printing device manufacturers to provide better service to printing device users. Users may also perform printing device tests before installing software drivers and connecting cables to a printing device so that problems in a system can be identified earlier, or isolated more easily, during the installation and/or setup process.

Although the systems and methods have been described in language specific to structural features and/or methodological steps, it is to be understood that the systems and methods defined in the appended claims is not necessarily limited to the specific features or steps described. Rather, the specific features and steps are disclosed as preferred forms of implementing the claimed systems and methods.

The invention claimed is:

1. A method for use in a printing device, comprising:
    contacting a manufacturer site on a network, the manufacturer site including information about the printing device and one or more tests for the printing device;
    receiving a printing device test from the manufacturer web site, the printing device test including one or more printing device test instructions;
    executing the printing device test; and
    transmitting test results to the manufacturer web site that indicate whether or not the printing device successfully completed the printing device test.

2. The method as recited in claim 1, further comprising receiving a user command to initiate the printing device test.

3. The method as recited in claim 1, wherein:
    the printer test is a set of instructions that command the printing device to print a test page; and
    the transmitting test results further comprises transmitting a user acknowledgement to the manufacturer web site, the user acknowledgement being entered by a printing device user and denoting whether or not the test page printed correctly.

4. The method as recited in claim 1, wherein the manufacturer site is a web site on the Internet.

5. The method as recited in claim 1, further comprising automatically determining the test results.

6. The method as recited in claim 1, wherein the receiving a printing device test further comprises receiving a command from the manufacturer site to execute a printing device test that is stored in the printing device.

7. The method as recited in claim 1, wherein the printing device further comprises a printer.

8. The method as recited in claim 1, wherein the printing device further comprises a copier.

9. The method as recited in claim 1, wherein the printing device further comprises a fax machine.

10. The method as recited in claim 1, wherein the printing device further comprises a plotter.

11. A printing device, comprising:
    a user interface configured to receive an entry to request that a manufacturer web site initiate a printing device test in the printing device to determine whether or not the printing device is operational;
    a browser configured to access a manufacturer web site that contains one or more printing device tests specific to the printing device; and
    a test module configured to execute the one or more printing device tests from the manufacturer web site.

12. The printing device as recited in claim 11, wherein:
    the one or more printing device tests stored at the manufacturer web site further comprise one or more sets of executable instructions that are configured to initialize a printer test on the printing device; and
    the test module is further configured to execute a set of executable instructions stored in the test module upon initialization from the manufacturer web site.

13. The printing device as recited in claim 11, wherein the test module is further configured to transmit a signal to the manufacturer site that indicates whether or not the printing device has successfully completed a printing device test.

14. The printing device as recited in claim 11, wherein the test module is further configured to prompt a user to indicate whether or not the printing device successfully completed a printing test, and to relay the indication to the manufacturer site.

15. One or more computer-readable media containing processor-executable instructions that, when executed on a processor, in a printing device, perform the following steps:
    accessing a remote testing web site;
    actuating a printing device test link on the remote testing web site to initiate a print test for the printing device; and
    transmitting data to the remote testing web site that indicates whether or not the print test executed successfully.

16. The one or more computer-readable media as recited in claim 15, further comprising automatically determining if the print test executed successfully.

17. The one or more computer-readable media as recited in claim 15, further comprising:
    displaying a user prompt requesting a user to indicate whether or not the print test executed successfully; and
    receiving user input that indicates if the print test executed successfully or not.

* * * * *

UNITED STATES PATENT AND TRADEMARK OFFICE
CERTIFICATE OF CORRECTION

| | | |
|---|---|---|
| PATENT NO. | : 7,301,660 B2 | Page 1 of 1 |
| APPLICATION NO. | : 10/370016 | |
| DATED | : November 27, 2007 | |
| INVENTOR(S) | : Terry Ryan Jamison et al. | |

It is certified that error appears in the above-identified patent and that said Letters Patent is hereby corrected as shown below:

In column 8, line 40, in Claim 15, delete "processor,in a printing device" and insert -- processor in a printing device --, therefor.

Signed and Sealed this

First Day of July, 2008

JON W. DUDAS
*Director of the United States Patent and Trademark Office*